US012746854B2

(12) United States Patent
Heo et al.

(10) Patent No.: US 12,746,854 B2
(45) Date of Patent: Sep. 29, 2026

(54) METHOD OF CONTROLLING AIR-CONDITIONING FOR OCCUPANTS THROUGH SEATING DETECTION

(71) Applicants: HYUNDAI MOTOR COMPANY, Seoul (KR); KIA CORPORATION, Seoul (KR)

(72) Inventors: Jae Won Heo, Seoul (KR); Jin Han Kim, Hwasun-eup (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 392 days.

(21) Appl. No.: 18/139,158

(22) Filed: Apr. 25, 2023

(65) Prior Publication Data

US 2024/0116328 A1 Apr. 11, 2024

(30) Foreign Application Priority Data

Oct. 7, 2022 (KR) ........................ 10-2022-0128510

(51) Int. Cl.
*B60N 2/00* (2006.01)
*B60H 1/00* (2006.01)

(52) U.S. Cl.
CPC ........... *B60N 2/002* (2013.01); *B60H 1/0073* (2019.05); *B60H 1/00742* (2013.01); *B60H 1/00807* (2013.01); *B60N 2210/40* (2023.08)

(58) Field of Classification Search
CPC ............ B60H 1/00742; B60H 1/00735; B60H 1/00285; B60H 1/00842
See application file for complete search history.

(56) References Cited

U.S. PATENT DOCUMENTS 6,170,274 B1 * 1/2001 Ichishi ................... B60H 1/247 454/313
9,150,132 B2 10/2015 Hoke et al.
9,758,015 B2 * 9/2017 Hoke ....................... B60N 2/56
11,014,424 B2 5/2021 Schumacher et al.
(Continued)

FOREIGN PATENT DOCUMENTS

KR 20050021166 A 3/2005
KR 20050114306 A 12/2005
(Continued)

*Primary Examiner* — Nelson J Nieves
(74) *Attorney, Agent, or Firm* — Lempia Summerfield Katz LLC

(57) ABSTRACT

A method of controlling air conditioning for occupants through seating detection includes: determining whether an entire air conditioning condition is satisfied when an air conditioner is operated and performing air conditioning for the entire vehicle when the entire air conditioning condition is satisfied; detecting whether an occupant is seated on a rear seat and performing air conditioning for the entire vehicle when it is determined that the occupant is seated on the rear seat; detecting whether the occupant is seated on a front occupant seat when it is determined that the occupant is not seated on the rear seat; determining a heat load condition by comparing an outdoor air temperature and an interior temperature; and performing air conditioning control in consideration of whether the occupant is seated on the front occupant seat and the heat load condition.

9 Claims, 6 Drawing Sheets

(56) References Cited

U.S. PATENT DOCUMENTS

| | | | | |
|---|---|---|---|---|
| 2001/0039806 | A1* | 11/2001 | Kawai | B60H 1/00742 374/E1.005 |
| 2004/0089004 | A1* | 5/2004 | Ogiso | B60H 1/00064 62/203 |
| 2009/0193825 | A1* | 8/2009 | Hara | B60H 1/00828 62/132 |
| 2011/0114739 | A1* | 5/2011 | Misumi | B60H 1/00742 454/143 |
| 2011/0284202 | A1* | 11/2011 | Hirai | B60H 1/00842 165/287 |
| 2014/0027090 | A1* | 1/2014 | Morikawa | B60H 1/00021 165/47 |
| 2015/0344044 | A1* | 12/2015 | Yuasa | B61D 27/0018 454/103 |
| 2015/0360538 | A1* | 12/2015 | Hoke | B60H 1/00285 219/217 |
| 2020/0223323 | A1* | 7/2020 | Fujino | B60H 1/00842 |
| 2020/0361281 | A1* | 11/2020 | Williams | B60H 1/00385 |
| 2022/0371401 | A1* | 11/2022 | Roth | B60H 1/00735 |

FOREIGN PATENT DOCUMENTS

| | | | |
|---|---|---|---|
| KR | 20090027976 | A | 3/2009 |
| KR | 20100125596 | A | 12/2010 |
| KR | 20180106323 | A | 10/2018 |
| KR | 20200021174 | A | 2/2020 |
| KR | 102226551 | B1 | 3/2021 |

* cited by examiner

METHOD OF CONTROLLING AIR-CONDITIONING FOR OCCUPANTS THROUGH SEATING DETECTION

CROSS-REFERENCE TO RELATED APPLICATION

This application claims under 35 U.S.C. § 119(a) the benefit of priority to Korean Patent Application No. 10-2022-0128510 filed on Oct. 7, 2022, the entire contents of which are incorporated herein by reference.

BACKGROUND

(a) Technical Field

The present disclosure relates to a method and apparatus for controlling air conditioning for occupants through seating detection. More specifically the present disclosure relates to a method and apparatus for controlling air conditioning for occupants through seating detection, which may secure an all-electric range (AER) of an electric vehicle by performing air conditioning centered on seats on which the occupants are seated to decrease an air conditioning load.

(b) Background Art

Generally, vehicles are equipped with a heating, ventilation, and air conditioning (HVAC) system for adjusting an interior (e.g., indoor) temperature of a vehicle and creating a more comfortable environment inside of the vehicle.

In addition, in recent years, a fully automatic temperature control (FATC) system for maintaining a comfortable environment by automatically adjusting the interior temperature according to a temperature set by a driver or an occupant has been applied to most vehicles. In the FATC system, to control the interior temperature when a user sets a temperature, an air conditioning controller receives sensor detection signals from a solar radiation sensor for detecting a solar radiation amount, an outdoor air temperature sensor for detecting an outdoor (e.g., exterior) air temperature, an interior temperature sensor for detecting an interior temperature of the vehicle, and the like. Furthermore, the air conditioning controller calculates an internal heat load based on a detected value of each sensor; and determines a discharge mode, a discharge temperature, a discharge direction, a discharge air volume, and the like in consideration of an air conditioning load equivalent thereto.

Today, the development of pollution-free eco-friendly electric vehicles (EVs) using an electric motor as a drive source by replacing internal combustion engine vehicles that use fossil fuel is ongoing. Electric vehicles are equipped with a battery for supplying power to an electric motor (drive motor) for driving the electric vehicle. Furthermore, charging the electric vehicle battery before traveling allows the electric vehicle to travel certain distances. As is well known, a range (AER on a single charge) of an electric vehicle is very important due to the limit of the energy storage density of the battery.

In particular, a lot of power is consumed from an electric vehicle battery since it is necessary to drive an electric heater for heating, a compressor for cooling, an air conditioning blower for sucking air (e.g., inside or outdoor air) to the interior of the vehicle for heating or cooling (air conditioning) the interior, and the like. In this case, the maximum range an electric vehicle may travel may be decreased by 50% at most due to the power consumption of the battery as compared to the range when the air conditioning system is not operated.

Electric vehicles use an electric heater and an electric compressor that consume battery power because electric vehicles have no engine to function as a heat source for heating and as a drive source for the compressor. Therefore, it is very important to decrease the electric load of the air conditioning system to increase the range of the electric vehicle. Thus, when the power consumption of the air conditioning system of an electric vehicle is decreased by ⅓, the range may be increased by nearly 40% or more.

However, in conventional electric vehicles, unnecessary power consumption for air conditioning occurs because the temperature of the entire interior of the vehicle is adjusted regardless of whether an occupant is seated. In addition, vehicles equipped with an individual air conditioning system designed to save energy are usually provided with an individual air conditioning button for selecting the activation and deactivation of the individual air conditioning. Furthermore, such vehicles are designed to enter an individual air conditioning mode or deactivate the individual air conditioning mode and switch to an entire air conditioning mode by operating the individual air conditioning button.

However, since the conventional individual air conditioning system heats and cools the interior of the vehicle by selecting the individual air conditioning mode and the entire air conditioning mode by simply operating only the individual air conditioning button regardless of the magnitude of the air conditioning load, the conventional system discharges conditioned air (cooled or heated air) to only some regions (e.g., driver seat) of the interior of the vehicle when the individual air conditioning mode is selected to decrease the power consumption for air conditioning. In this case, there may be a problem in that the interior temperature reaches a desired temperature too late under a condition in which a required air conditioning load is high (e.g., a high cooling or high heating condition), resulting in the adverse effect of lowering the comfort of the occupants.

The above information disclosed in this Background section is only to enhance understanding of the background of the disclosure. Therefore, the Background section may include information that does not form the prior art that is already known in this country to a person of ordinary skill in the art.

SUMMARY

The present disclosure has been made in efforts to solve the above mentioned problems. An object of the present disclosure is directed to providing a method and apparatus for controlling air conditioning for occupants through seating detection. Specifically, the method and apparatus may determine a heat load condition by comparing an outdoor (e.g., exterior) air temperature and an interior (e.g., indoor) temperature with respective set values and performing air conditioning in consideration of whether an occupant is seated on each seat and the heat load condition.

In addition, the present disclosure is directed to providing a method and apparatus for controlling air conditioning for occupants through seating detection. The method and apparatus may perform air conditioning centered on a seat where an occupant is seated and decrease an air conditioning load by applying a radiation warmer.

Objects of the present disclosure are not limited to the above-described objects. Other objects not mentioned herein may be understood by the following description, and more clearly seen by embodiments of the present disclosure. In addition, the objects of the present disclosure may be achieved by features described in the claims and combinations thereof.

A method of controlling air conditioning for occupants through seating detection for achieving the objects of the present disclosure includes the following operations.

In one embodiment of the present disclosure, a method is provided of controlling air conditioning for occupants through seating detection. The method includes determining whether an entire air conditioning condition is satisfied when an air conditioner is operated and performing air conditioning for the entire vehicle when the entire air conditioning condition is satisfied. The method further includes detecting whether an occupant is seated on a rear seat and performing the air conditioning for the entire vehicle when it is determined that the occupant is seated on the rear seat. Additionally, the method includes detecting whether the occupant is seated on a front occupant seat when it is determined that the occupant is not seated on the rear seat, determining a heat load condition by comparing an outdoor air temperature and an interior temperature, and performing air conditioning control in consideration of whether the occupant is seated on the front occupant seat and the heat load condition.

In addition, determining the heat load condition may include determining the heat load condition to be a high load outdoor air temperature condition when the outdoor air temperature exceeds the range of a first set temperature. Additionally, determining the heat load condition may include determining the heat load condition to be a low load outdoor air temperature condition when the outdoor air temperature is in the range of the first set temperature. Also, determining the heat load condition may also include determining the heat load condition to be a high load interior temperature condition when the interior temperature is in the range of a second set temperature and determining the heat load condition to be an intermediate load interior temperature condition when the interior temperature is in the range of a third set temperature. Furthermore, determining the heat load condition may include determining the heat load condition to be a low load interior temperature condition when the interior temperature is smaller than the range of the third set temperature.

In addition, when it is determined that the occupant is seated on the front occupant seat in the operation of determining whether the occupant is seated on the front occupant seat, air conditioning for the entire vehicle may be performed when the high load outdoor air temperature condition or the high load interior temperature condition is satisfied. Also, air conditioning for a first row may be performed when the low load outdoor air temperature condition or the low load interior temperature condition is satisfied.

In addition, when it is determined that the occupant is not seated on the front occupant seat in the operation of determining whether the occupant is seated on the front occupant seat, air conditioning for the entire vehicle may be performed when the high load outdoor air temperature condition or the high load interior temperature condition is satisfied. Also, air conditioning for a first row may be performed when the intermediate load interior temperature condition is satisfied, and air conditioning for a driver seat may be performed when the low load outdoor air temperature condition or the low load interior temperature condition is satisfied.

In addition, the entire air conditioning condition may be determined in consideration of whether a deep mode is turned on, whether a sync is released, and whether an individual air conditioning button is operated.

In addition, detecting whether the occupant is seated on the rear seat may include determining whether the occupant is seated on the rear seat by the opening and closing of a door of the rear seat and the detection of a weight of the rear seat when a rear occupant alert (ROA) is applied. Also, detecting whether the occupant is seated on the rear seat may further include determining whether the occupant is seated on the rear seat by the opening and closing of the door of the rear seat when the ROA is not applied.

In addition, detecting whether the occupant is seated on the front occupant seat may include determining whether the occupant is seated on the front occupant seat in consideration of the opening and closing of a door of the front occupant seat, the detection of a weight of the front occupant seat, and whether a belt of the front occupant seat is fastened.

In addition, the interior temperature may be measured as an absolute value of a difference between a user set temperature and an interior temperature of a vehicle.

In addition, the air conditioning control may further include performing warmer control of a seat to be air-conditioned.

An apparatus for controlling air conditioning for occupants through seating detection for achieving the objects of the present disclosure includes the following configuration.

In one embodiment of the present disclosure, an apparatus is provided for controlling air conditioning for occupants through seating detection. The apparatus includes a heating, ventilation, and air conditioning (HVAC) system configured to discharge air conditioned from an air conditioner of a vehicle to a plurality of seats, a detection sensor unit formed on the plurality of seats and configured to detect whether an occupant is seated on the seat, and a controller. The controller is configured to determine a heat load condition by comparing an outdoor air temperature and an interior temperature with the respective set values and to receive a detection signal from the detection sensor unit to selectively control an operation of the HVAC system.

In addition, the controller may determine the heat load condition to be a high load outdoor air temperature condition when the outdoor air temperature exceeds the range of a first set temperature and may determine the heat load condition to be a low load outdoor air temperature condition when the outdoor air temperature is in the range of the first set temperature. The controller may further determine the heat load condition to be a high load interior temperature condition when the interior temperature is in the range of a second set temperature and may determine the heat load condition to be an intermediate load interior temperature condition when the interior temperature is in the range of a third set temperature. Furthermore, the controller may determine the heat load condition to be a low load interior temperature condition when the interior temperature is smaller than the range of the third set temperature.

In addition, when it is determined that the occupant is seated on the front occupant seat in the operation of determining whether the occupant is seated on the front occupant seat, the controller may perform air conditioning for the entire vehicle when the high load outdoor air temperature condition or the high load interior temperature condition is satisfied. The controller may also perform air conditioning for a first row when the low load outdoor air temperature condition or the low load interior temperature condition is satisfied.

In addition, when it is determined that the occupant is not seated on the front occupant seat in the operation of determining whether the occupant is seated on the front occupant seat, the controller may perform air conditioning for the entire vehicle when the high load outdoor air temperature condition or the high load interior temperature condition is satisfied. Additionally, the controller may perform air conditioning for a first row when the intermediate load interior temperature condition is satisfied and may perform air conditioning for a driver seat when the low load outdoor air temperature condition or the low load interior temperature condition is satisfied.

In addition, the plurality of seats may include a front occupant seat and a rear seat. The detection sensor unit of the front occupant seat may include a door opening and closing detection sensor, a pressure sensor, and a belt fastening detection sensor. The detection sensor unit of the rear seat includes a rear occupant alert (ROA) sensor or the door opening and closing detection sensor.

In addition, the pressure sensor may be under the plurality of seats and configured to detect the load of the occupant.

In addition, the ROA sensor may be positioned on a headlining and configured to detect whether the occupant is seated on the rear seat when a door of the vehicle is locked after a driver gets out of the vehicle.

In addition, the apparatus may further include a warmer using radiant heat generated from a heating element formed on a floor of the vehicle.

The present disclosure can obtain the following effects by the configuration, coupling, and use relationship described below according to embodiments.

It is possible to secure the all-electric range (AER) of the electric vehicle by determining a heat load condition by comparing the outdoor air temperature and the interior temperature with the respective set values and performing the air conditioning control in consideration of whether an occupant is seated on each seat and of the heat load condition to decrease the air conditioning load.

In addition, it is possible to decrease the heat load when the air conditioning is operated by decreasing the air conditioning load by applying the radiation warmer as well as performing the air conditioning centered on the seats where the occupants are seated.

It should be understood that the terms "automotive" or "vehicular" or other similar terms as used herein are inclusive of motor vehicles in general. Such motor vehicles may encompass passenger automobiles including sports utility vehicles (SUVs), buses, trucks, various commercial vehicles, watercraft including a variety of boats and ships, aircraft, and the like. Such motor vehicles may also include hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is an automobile that has two or more sources of power, such as for example vehicles that are both gasoline-powered and electric-powered.

The above and other features of the disclosure are discussed below.

BRIEF DESCRIPTION OF THE DRAWINGS

The above and other features of the present disclosure are described in detail with reference to certain examples thereof illustrated in the accompanying drawings, which are given herein below by way of illustration only, and thus are not limitative of the present disclosure, and wherein.

It should be understood that the appended drawings are not necessarily drawn to scale, presenting a somewhat simplified representation of various advantageous features illustrative of the basic principles of the disclosure. The specific design features of the present disclosure as disclosed herein, including, for example, specific dimensions, orientations, locations, and shapes will be determined in part by the particular intended application and use environment.

In the figures, the same reference numbers refer to the same or equivalent parts of the present disclosure throughout the several figures of the drawings.

DETAILED DESCRIPTION

Hereinafter, embodiments of the present disclosure are described in more detail with reference to the accompanying drawings. Embodiments of the present disclosure may be modified in various forms and the scope of the present disclosure should not be construed as being limited to the following embodiments. The embodiments are provided to more completely describe the present disclosure to those having ordinary skill in the art.

In addition, terms such as ". . . unit" described herein refer to a unit for processing at least one function or operation, which may be implemented by hardware, software, or a combination of hardware and/or software. Herein, a controller and other components may include a processor, a memory, and a storage and may include a program run through algorithms or software to operate.

In addition, in the specification, when a certain portion is described as being positioned "on" or "above" another portion, this includes not only a case in which the certain portion is positioned "directly on" another portion but also a case in which other portions are present therebetween. In addition, when a certain portion is described as being positioned "under" or "below" another portion, this includes not only a case in which the certain portion is positioned "directly under" but also a case in which other portions are present therebetween.

In addition, in the specification, the reason that the names of the components are divided into the first, the second, and the like is to distinguish the names of the components in the same relationship, and the following description is not necessarily limited to the order thereof.

When a component, device, element, unit, or the like of the present disclosure is described as having a purpose or performing an operation, function, or the like, the component, device, element, or unit should be considered herein as being "configured to" meet that purpose or to perform that operation or function.

In each operation, identification signs are used for convenience of description. The identification signs do not describe the order of the respective operations and each operation may be performed differently from the specified order unless the context clearly states a specific order.

Figure 1:
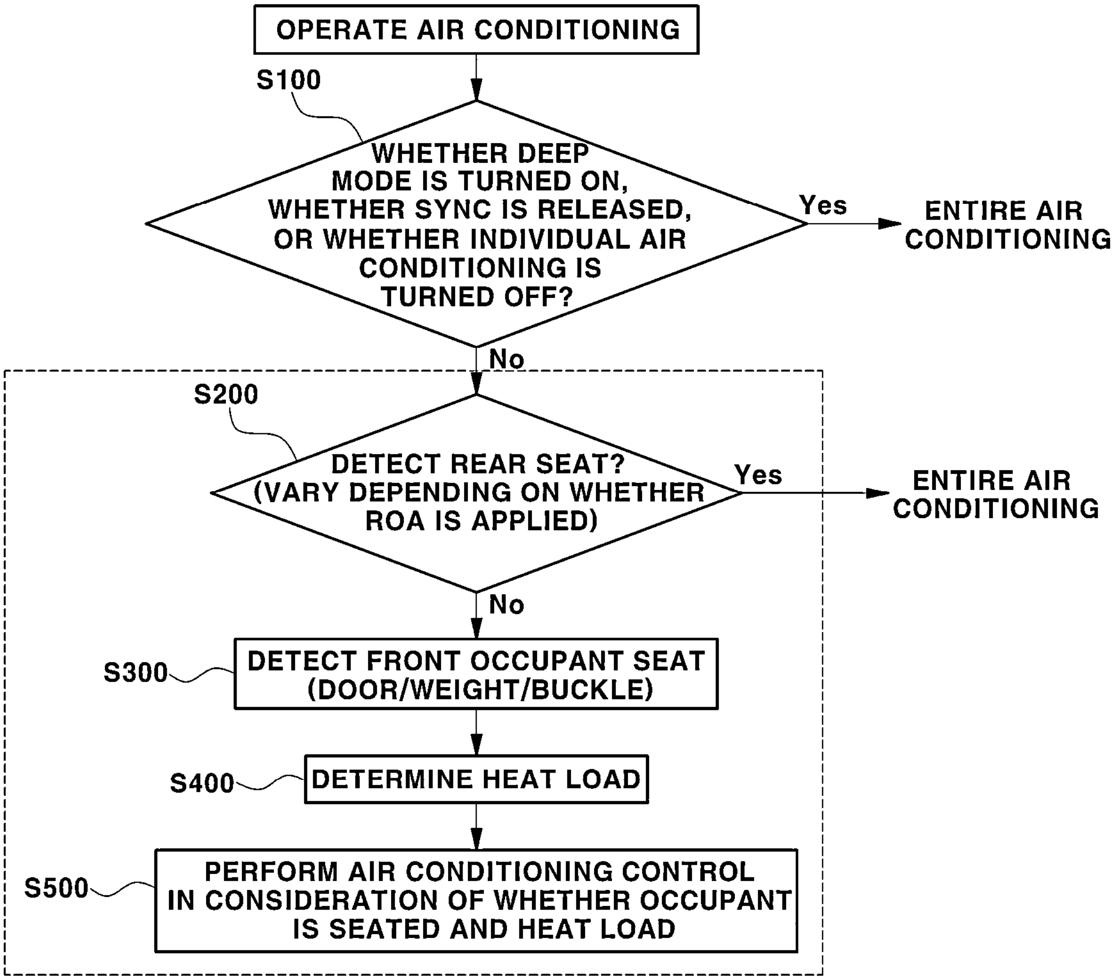
FIG. 1 shows a flowchart of a method of controlling air conditioning for occupants through seating detection as one embodiment of the present disclosure.
Figure 2:
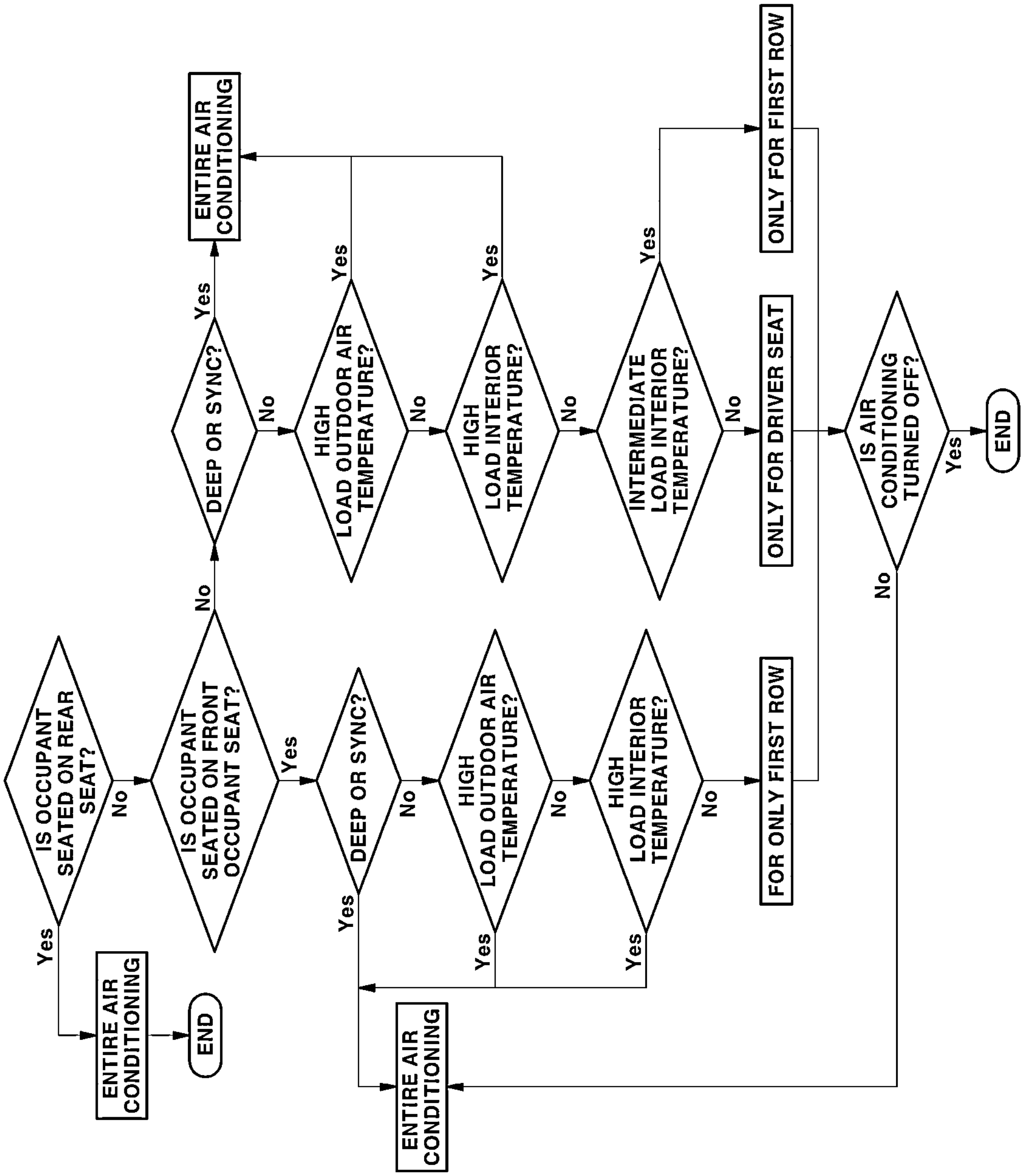
FIG. 2 shows an enlarged view of a part of the flowchart of the method of controlling the air conditioning for occupants through seating detection shown in FIG. 1 as one embodiment of the present disclosure.

FIG. 1 shows a flowchart of a method of controlling air conditioning for occupants through seating detection as one embodiment of the present disclosure. FIG. 2 shows an enlarged view of a part of the flowchart of the method of controlling the air conditioning for occupants through seating detection shown in FIG. 1 as one embodiment of the present disclosure.

Referring to FIGS. 1 and 2, the method of controlling the air conditioning for occupants through seating detection according to one embodiment of the present disclosure may include an operation of determining whether the entire air conditioning condition is satisfied when the air conditioner is operated and performing the air conditioning of the entire vehicle when the entire air conditioning condition is satisfied (S100).

The entire air conditioning condition may be determined in consideration of whether a deep mode is turned on, whether a sync is released, and whether an individual air conditioning button is operated. In one embodiment, when the deep mode is turned on, the sync is released, or the individual air conditioning button is not operated, it may be determined that the entire air conditioning condition is satisfied. In one embodiment, the individual air conditioning button according to the present disclosure may be configured so that an indicator for displaying the activation and deactivation of an individual air conditioning mode may be visually recognized on a surface of the individual air conditioning button. The individual air conditioning button may be configured to be recognized as lit (e.g., illuminated) when a driver or an occupant manually operates the individual air conditioning button or the mode is automatically switched.

Figure 5:
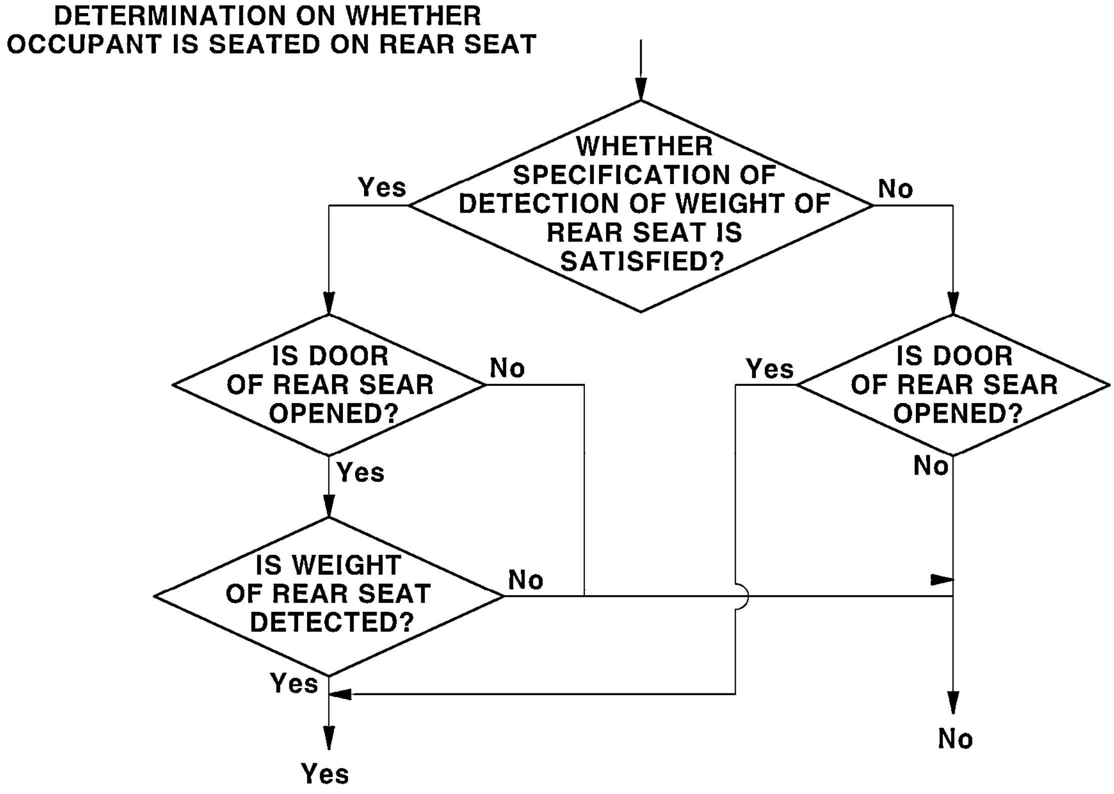
FIG. 5 shows a view of detecting whether an occupant is seated on a rear seat in the method of controlling the air conditioning for occupants through seating detection as one embodiment of the present disclosure.

FIG. 5 shows a view showing detecting whether an occupant is seated on a rear seat in the method of controlling the air conditioning for occupants through seating detection as one embodiment of the present disclosure.

Referring to FIG. 5, an operation of detecting whether an occupant is seated on a rear seat (S200) may vary depending on whether a rear occupant alert (ROA) is applied. When a ROA is applied, the detection of whether an occupant is seated on the rear seat may be determined by the opening and closing of a door of the rear seat and the detection of a weight or load on the rear seat. When the ROA is not applied, the detection of whether an occupant is seated on the rear seat may be determined by the opening and closing of the door of the rear seat.

For example, when the ROA is not applied, it may be determined that an occupant is seated on the rear seat even when a belt of the rear seat is not fastened, a door of the rear seat is opened, and a weight is detected. Furthermore, when a heavy object is placed on the rear seat, it may be determined that an occupant is seated on the rear seat even though an occupant is not actually seated on the rear seat.

In another example, when the ROA is not applied, it may be determined that an occupant is seated on the rear seat even when the door of the rear seat is opened, a weight is detected, and a belt of the rear seat is fastened. For example, it may be determined that an occupant is seated on the rear seat even though an occupant is not actually seated on the rear seat when a heavy object is placed on the rear seat and a belt of the rear seat is fastened to prevent the heavy object from moving.

In another example, when the ROA is not applied, it may be determined that an occupant is seated on the rear seat when the door of the rear seat is opened. In the operation of detecting whether an occupant is seated on the rear seat (S200), the air conditioning for the entire vehicle may be performed when it is determined that the occupant is seated on the rear seat.

Next, when it is determined that an occupant is not seated on the rear seat, an operation of detecting whether an occupant is seated on a front occupant seat (S300) may include determining whether the occupant is seated on the front occupant seat according to the opening and closing of a door of the front occupant seat, the detection of a weight of the front occupant seat, and whether a belt of the front occupant seat is fastened.

In one embodiment, it may be determined that an occupant is seated on a front occupant seat when the door of the front occupant seat is opened, a weight is detected, and the belt of the front occupant seat is fastened. In this case, it may be determined that an occupant is seated on the front occupant seat even when the occupant is not actually seated on the front occupant seat when the belt of the front occupant seat is fastened to prevent a heavy object from shaking when it is placed on the front occupant seat.

Next, the present disclosure may include an operation of determining heat load condition (S400) by comparing an outdoor (e.g., exterior) air temperature and an interior (e.g., indoor) temperature with respective set values. The present disclosure may include an operation of performing air conditioning control in consideration of whether an occupant is seated on the front occupant seat and the heat load condition (S500) by including the operation of determining the heat load condition (S400).

More specifically, the operation of determining the heat load condition (S400) may include determining a heat load condition by comparing the outdoor air temperature with a first set temperature. The operation further includes determining a heat load condition by comparing the interior temperature with a second set temperature or a third set temperature.

Figure 3:
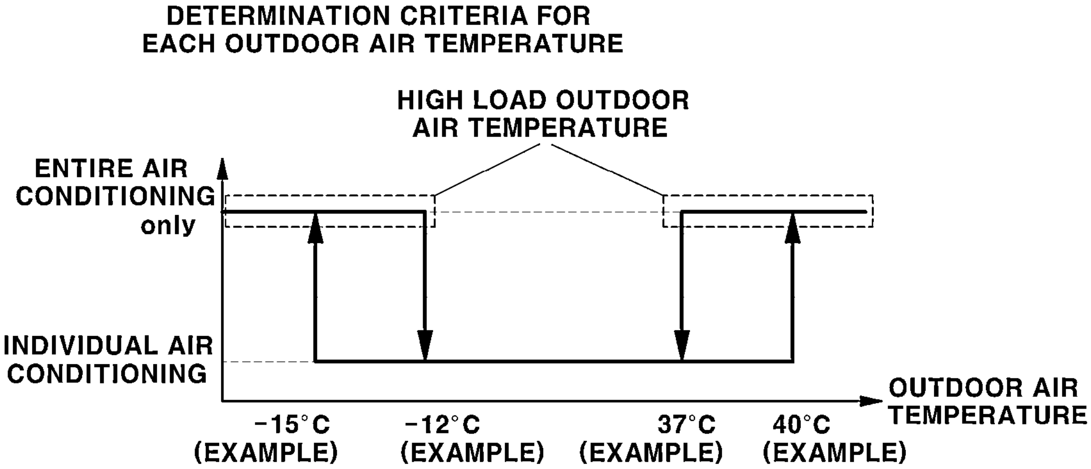
FIG. 3 shows criteria for determining an outdoor air temperature condition among a heat load condition in the method of controlling the air conditioning for occupants through seating sensing as one embodiment of the present disclosure.
Figure 4:
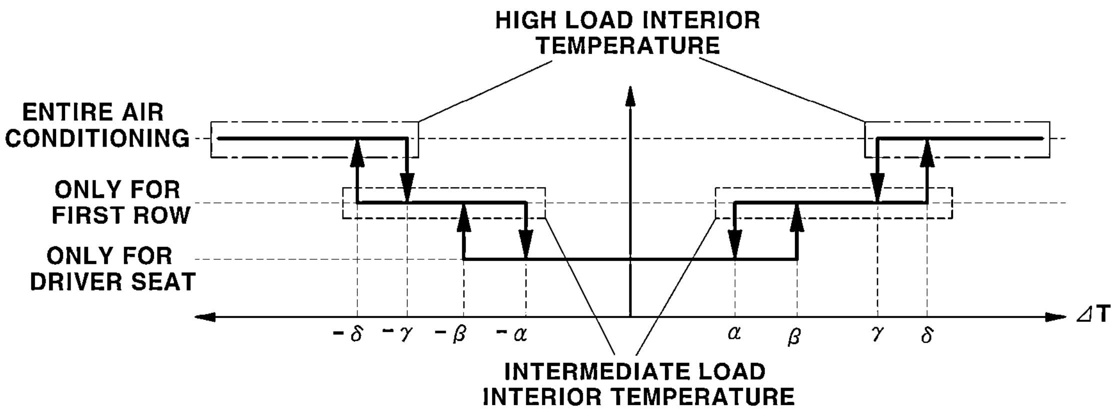
FIG. 4 shows criteria for determining an interior temperature condition among the heat load condition in the method of controlling the air conditioning for occupants through seating detection as one embodiment of the present disclosure.

FIG. 3 shows criteria for determining an outdoor air temperature condition among the heat load condition in the method of controlling the air conditioning for occupants through seating sensing as one embodiment of the present disclosure. FIG. 4 shows criteria for determining an interior temperature condition among the heat load condition in the method of controlling the air conditioning for occupants through seating detection as one embodiment of the present disclosure.

Referring to FIGS. 3 and 4, according to the present disclosure, the heat load condition may be determined as a high load condition, an intermediate load condition, and a low load condition according to measured values of the outdoor air temperature and the interior temperature. More specifically, as shown in FIG. 3, the outdoor air temperature may be measured by dividing the outdoor air temperature according to temperatures in winter and summer as temperature values outside the vehicle.

In one embodiment, when the outdoor air temperature is measured at minus 15 degrees Celsius or minus 12 degrees Celsius in the winter and 37 degrees Celsius or 40 degrees Celsius in the summer, the first set temperature may be set to a range from minus 12 degrees Celsius to 37 degrees Celsius. The operation of determining the heat load condition (S400) may include determining the heat load condition as the high load outdoor air temperature condition when the outdoor air temperature exceeds the range of the first set temperature. In addition, the operation of determining the heat load condition (S400) may include determining the heat load condition as the low load outdoor air temperature condition when the outdoor air temperature is in the range of the first set temperature.

As shown in FIG. 4, in the operation of determining the heat load condition (S400), the interior temperature may be measured as an absolute value of a difference between a user set temperature and an interior temperature of a vehicle. In one embodiment, when the interior temperature is measured as an a value, a β value, a γ value, and a δ value, the second set temperature may be set to the γ value or more. Additionally, the third set temperature is set to be greater than or equal to the β value and smaller than or equal to the δ value.

In the operation of determining the heat load condition (S400), when the interior temperature is in the range of the second set temperature, the heat load condition may be determined as the high load interior temperature condition. In addition, in the operation of determining the heat load condition (S400), when the interior temperature is in the range of the third set temperature range, the heat load condition may be determined as the intermediate load interior temperature condition. In addition, in the operation of determining the heat load condition (S400), when the interior temperature is smaller than the range of the third set temperature, the heat load condition may be determined as the low load interior temperature condition.

The interior temperature gradually decreases over time after the air conditioning control starts, and the interior temperature of the vehicle reaches the user set temperature. Therefore, the interior temperature may be determined over time from the high load interior temperature condition to the intermediate load interior temperature condition, and from the intermediate load interior temperature condition to the low load interior temperature condition, which is different from the outdoor air temperature.

Referring to FIG. 2, when it is determined that an occupant is seated on the front occupant seat in the operation of determining whether an occupant is seated on the front occupant seat (S300), air conditioning for the entire vehicle may be performed when the high load outdoor air temperature condition or the high load interior temperature condition is satisfied. Therefore, when an occupant is seated on the front occupant seat, it may be advantageous in terms of energy saving to reduce an air conditioning operation time by performing air conditioning for the entire vehicle even when the occupant is not seated on the rear seat under the high load outdoor air temperature condition or the high load interior temperature condition.

When it is determined that an occupant is seated on the front occupant seat in the operation of determining whether an occupant is seated on the front occupant seat (S300), air conditioning for a first row may be performed when the low load outdoor air temperature condition or the low load interior temperature condition is satisfied. When an occupant is seated on the front occupant seat, it may be advantageous in terms of energy saving to perform the air conditioning for only the first row corresponding to the driver seat and the front occupant seat by individually performing air conditioning. This is because there are no occupants that are seated on the rear seats under the low load outdoor air temperature condition or the low load interior temperature condition.

When it is determined that an occupant is not seated on the front occupant seat in the operation of determining whether an occupant is seated on the front occupant seat (S300), air conditioning for the entire vehicle is performed under the high load outdoor air temperature condition or the high load interior temperature condition. Therefore, when an occupant is not seated on the front occupant seat, it may be advantageous in terms of energy saving to reduce the air conditioning operation time by performing the air conditioning for the entire vehicle even when no occupants are seated on the front occupant seat and the rear seats under the high load outdoor air temperature condition or the high load interior temperature condition.

When it is determined that an occupant is not seated on the front occupant seat in the operation of determining whether an occupant is seated on the front occupant seat (S300), air conditioning for the first row may be performed when the intermediate load interior temperature condition is satisfied. When an occupant is not seated on the front occupant seat, it may be advantageous in terms of energy saving to reduce the air conditioning operation time by performing the air conditioning for the first row even when no occupants are seated on the front occupant seat and the rear seats under the intermediate load interior temperature condition. Since the intermediate load interior temperature condition is a case in which the air conditioning control is performed earlier than the high load interior temperature condition and time has elapsed, the interior temperature is measured to be low. Thus, only air conditioning for the first row may be performed because the air conditioning for the entire vehicle is unnecessary.

When it is determined that an occupant is not seated on the front occupant seat in the operation of determining whether an occupant is seated on the front occupant seat (S300), air conditioning for the driver seat may be performed when the low load outdoor air temperature condition or the low load interior temperature condition is satisfied. Since no occupants are seated on the front occupant seat and the rear seats under the low load outdoor air temperature condition or the low load interior temperature condition, it may be advantageous in terms of energy saving to individually perform air conditioning for the driver seat.

Figure 6:
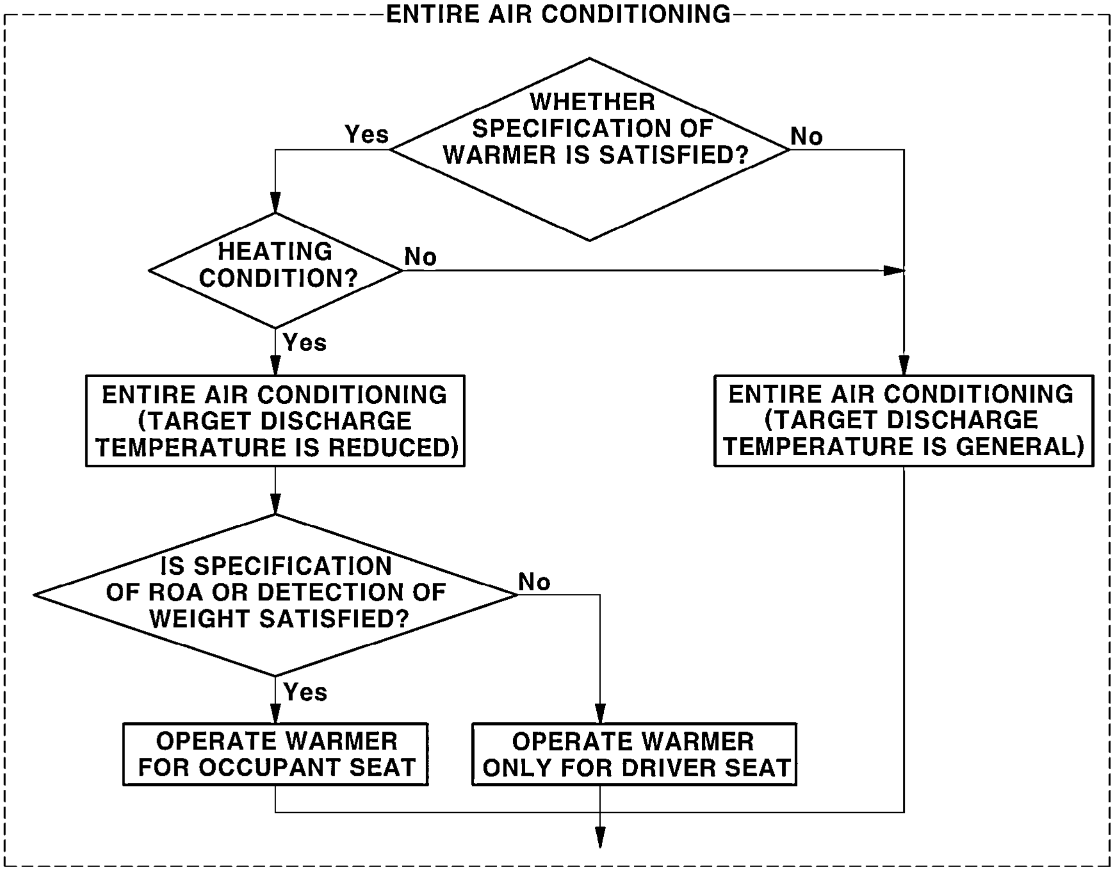
FIGS. 6 and 7 show warmer control in the method of controlling the air conditioning for occupants through seating detection as one embodiment of the present disclosure.
Figure 7:
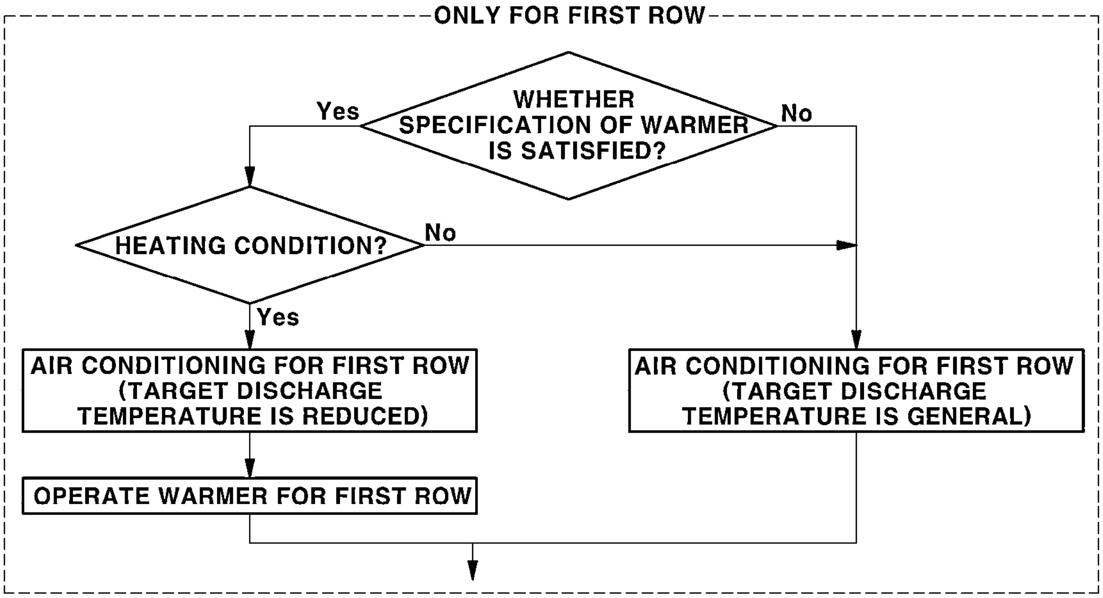

FIGS. 6 and 7 show warming control in the method of controlling the air conditioning for occupants through seating detection as one embodiment of the present disclosure.

Referring to FIGS. 6 and 7, the air conditioning control in the method of controlling the air conditioning for occupants through seating detection according to one embodiment of the present disclosure may further include performing warmer control or warming control of a seat to be air-conditioned.

In future vehicles including "Mobility Ondol," a radiant heat warming device, i.e., a warmer, may be introduced into vehicles as a new concept for heating equipment compensating for the shortcomings of the conventional heating system. Unlike a heating, ventilation, and air conditioning (HVAC) system using convection, the warmer may have a heating element using the principle of radiant heat formed on a floor of the vehicle and may be applied to a large area of an interior floor of the vehicle.

The operation of performing the warmer control, i.e., controlling the warmer or warming device, according to the present disclosure may be individually performed for each of the driver seat, the front occupant seat, and the rear seats. In one embodiment, in the operation of performing the warmer control, the warmer control may be performed in conjunction with the air conditioning control when the user manually presses an operation button.

In one embodiment, as shown in FIG. 6, in the operation of determining whether the entire air conditioning condition is satisfied when the air conditioner is operated and performing air conditioning for the entire vehicle when the entire air conditioning condition is satisfied (S100), the warmer control of the seat to be air-conditioned may be performed in conjunction with the air conditioning control when a weight is detected in a mode in which the warmer control is operated.

In addition, in one embodiment, as shown in FIG. 7, when it is determined that there is an occupant in the operation of determining whether an occupant is seated on a front occupant seat (S300), the warmer control for the first row may be performed in conjunction with the air conditioning control in the mode in which the warmer control is operated when the air conditioning for the first row is performed when the low load outdoor air temperature condition or the low load interior temperature condition is satisfied.

Figure 8:
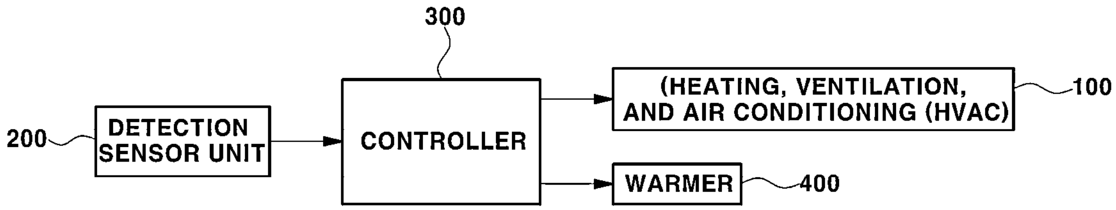
FIG. 8 shows a block diagram of an apparatus for controlling air conditioning for occupants through seating detection as one embodiment of the present disclosure.

FIG. 8 shows a block diagram of an apparatus for controlling air conditioning for occupants through seating detection as one embodiment of the present disclosure.

Referring to FIG. 8, the apparatus for controlling the air conditioning for occupants through seating detection according to one embodiment of the present disclosure may include a heating, ventilation, and air conditioning (HVAC) system 100, a detection sensor unit 200, and a controller 300. The HVAC system 100 may be configured to discharge air conditioned from an air conditioner of the vehicle to a plurality of seats. The detection sensor unit 200 may be formed on the plurality of seats and configured to detect whether an occupant is seated on a seat. The plurality of seats may include a driver seat, a front occupant seat, and a rear seat.

The detection sensor unit 200 of the front occupant seat may include a door opening and closing detection sensor, a pressure sensor, and a belt fastening detection sensor. Furthermore, the detection sensor unit 200 of the rear seat may include a rear occupant alert (ROA) sensor or a door opening and closing detection sensor. The pressure sensor may be under the plurality of seats and configured to detect the load of the occupant. The ROA sensor may be positioned on a headlining and configured to detect whether the occupant is seated on the rear seat when the vehicle door is locked after the driver gets out of the vehicle.

The controller 300 may be configured to compare an outdoor air temperature and an interior temperature with respective set values to determine a heat load condition and receive a detection signal from the detection sensor unit 200 to selectively control an operation of the HVAC system 100. To this end, the controller 300 may be configured to measure an external or outdoor temperature around the vehicle based on an output signal of the outdoor air temperature sensor of the vehicle and measure the interior temperature of the vehicle based on an output signal of the interior temperature sensor of the vehicle.

The controller 300 may be configured to determine the heat load condition to be a high load outdoor air temperature condition when the outdoor air temperature exceeds the range of a first set temperature. The controller 300 may also be configured to determine the heat load condition to be a low load outdoor air temperature condition when the outdoor air temperature is in the range of the first set temperature. In addition, the controller 300 may determine the heat load condition to be the high load temperature condition when the interior temperature is in the range of a second set temperature and may determine the heat load condition to be an intermediate load interior temperature condition when the interior temperature is in the range of a third set temperature. Additionally, the controller 300 may determine the heat load condition to be a low load interior temperature condition when the interior temperature is smaller than the range of the third set temperature.

When it is determined that an occupant is seated on the front occupant seat in the operation of determining whether an occupant is seated on the front occupant seat, the controller 300 may be configured to perform air conditioning for the entire vehicle when the high load outdoor air temperature condition or the high load interior temperature condition is satisfied. Furthermore, the controller 300 may be configured to perform air conditioning for a first row when the low load outdoor air temperature condition or the low load interior temperature condition is satisfied.

When it is determined that an occupant is not seated on the front occupant seat in the operation of determining whether an occupant is seated on the front occupant seat, the controller 300 may be configured to perform air-conditioning for the entire vehicle when the high load outdoor air temperature condition or the high load interior temperature condition is satisfied. Furthermore, the controller 300 may be configured to perform air conditioning for the driver seat when the low load outdoor air temperature condition or the low load interior temperature condition is satisfied.

The apparatus for controlling the air conditioning for occupants through seating detection according to one embodiment of the present disclosure may further include a warming device, i.e., a warmer 400 using radiant heat generated from a heating element formed on the floor of the vehicle. The warmer 400 may also be individually formed on each of the driver seat, the front occupant seat, and the rear seat and may also be formed on the entire floor of the vehicle. The warmer 400 may be configured to perform heating in conjunction with the air conditioning control while the HVAC system 100 performs the air conditioning control.

In summary, it is possible to reduce the air conditioning load by determining the heat load condition and by performing air conditioning centered on the seat on which an occupant is seated through the detection of the occupant. Thus, the present disclosure provides a method and apparatus for controlling the air conditioning for occupants through seating detection, which may secure the AER of the electric vehicle.

The above detailed description is illustrative of the present disclosure. In addition, the above description shows and describes embodiments of the present disclosure, and the present disclosure may be used in various other combinations, changes, and environments. In other words, changes or modifications are possible within the spirit and scope of the inventive concept disclosed herein, the scope equivalent to the described disclosure, and/or the scope of those having ordinary skill or knowledge in the art. The various embodiments describe modes for implementing the technical spirit of the present disclosure, and various changes required in specific applications and uses of the present disclosure are possible. Therefore, the detailed description of the disclosure is not intended to limit the scope of the present disclosure to the disclosed embodiments. In addition, the appended claims should be construed as also including other embodiments.

What is claimed is:

1. A method of controlling air conditioning for occupants through seating detection, the method comprising:

determining whether an entire air conditioning condition is satisfied when an air conditioner is operated and performing air conditioning for an entire vehicle when the entire air conditioning is satisfied;

detecting whether an occupant is seated on a rear seat and performing air conditioning for the entire vehicle when it is determined that the occupant is seated on the rear seat;

detecting whether the occupant is seated on a front passenger seat when it is determined that the occupant is not seated on the rear seat;

determining a heat load condition by comparing an outdoor air temperature and an interior temperature; and performing air conditioning control in consideration of whether the occupant is seated on the front passenger seat and the heat load condition, wherein performing air conditioning control further comprises performing warmer control to provide radiant heat to the occupant, the warmer control being performed using a heating element disposed on a floor of the vehicle such that the radiant heat is provided by the heating element.

2. The method of claim 1, wherein the determining of the heat load condition includes:

determining the heat load condition to be a high load outdoor air temperature condition when the outdoor air temperature exceeds a range of a first set temperature;

determining the heat load condition to be a low load outdoor air temperature condition when the outdoor air temperature is in the range of the first set temperature;

determining the heat load condition to be a high load interior temperature condition when the interior temperature is in the range of a second set temperature;

determining the heat load condition to be a high load interior temperature condition when the interior temperature is in the range of a second set temperature; and determining the heat load condition to be a low load interior temperature condition when the interior temperature is smaller than the range of the third set temperature.

3. The method of claim 2, wherein, when it is determined that the occupant is seated on the front passenger seat in the detecting of whether the occupant is seated on the front passenger seat, air conditioning for the entire vehicle is performed when the high load outdoor air temperature condition or the high load interior temperature condition is satisfied, and air conditioning for a first row is performed when the low load outdoor air temperature condition or the low load interior temperature condition is satisfied.

4. The method of claim 2, wherein, when it is determined that the occupant is not seated on the front passenger seat in the detecting of whether the occupant is seated on the front passenger seat, air conditioning for the entire vehicle is performed when the high load outdoor air temperature condition or the high load interior temperature condition is satisfied, air conditioning for a first row is performed when the intermediate load interior temperature condition is satisfied, and air conditioning for a driver seat is performed when the low load outdoor air temperature condition or the low load interior temperature condition is satisfied.

5. The method of claim 1, wherein the entire air conditioning condition is determined in consideration of whether a deep mode is turned on, whether a sync is released, and whether an individual air conditioning button is operated.

6. The method of claim 1, wherein detecting whether the occupant is seated on the rear seat includes:

determining whether the occupant is seated on the rear seat by an opening and closing of a door of the rear seat and detection of a weight of the rear seat when a rear occupant alert (ROA) is applied; and determining whether the occupant is seated on the rear seat by the opening and closing of the door of the rear seat when the ROA is not applied.

7. The method of claim 1, wherein the detecting of whether the occupant is seated on the front passenger seat includes determining whether the occupant is seated on the front passenger seat in consideration of an opening and closing of a door of the front passenger seat, detection of a weight of the front passenger seat, and whether a belt of the front passenger seat is fastened.

8. The method of claim 1, wherein the interior temperature is measured as an absolute value of a difference between a user set temperature and an interior temperature of a vehicle.

9. The method of claim 1, wherein performing warmer control is performed for each of a driver seat, the front passenger seat, and the rear seat.

* * * * *